United States Patent
Yoshinoya

(10) Patent No.: US 11,084,018 B2
(45) Date of Patent: Aug. 10, 2021

(54) CATALYTIC REACTOR

(71) Applicant: IHI CORPORATION, Tokyo (JP)

(72) Inventor: Takuya Yoshinoya, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 16/580,420

(22) Filed: Sep. 24, 2019

(65) Prior Publication Data

US 2020/0030770 A1 Jan. 30, 2020

Related U.S. Application Data

(63) Continuation of application No. PCT/JP2018/012659, filed on Mar. 28, 2018.

(30) Foreign Application Priority Data

Mar. 31, 2017 (JP) .............................. JP2017-069748

(51) Int. Cl.
*B01J 19/24* (2006.01)

(52) U.S. Cl.
CPC ........... *B01J 19/248* (2013.01); *B01J 19/249* (2013.01); *B01J 19/2485* (2013.01); *B01J 2219/187* (2013.01); *B01J 2219/2428* (2013.01); *B01J 2219/2448* (2013.01); *B01J 2219/2459* (2013.01); *B01J 2219/2479* (2013.01); *B01J 2219/2498* (2013.01)

(58) Field of Classification Search
None
See application file for complete search history.

(56) References Cited

U.S. PATENT DOCUMENTS

| 5,320,428 A * | 6/1994 | Streiff ................ B01D 53/8631 366/337 |
| 5,330,728 A * | 7/1994 | Foster ................ B01D 53/9454 422/177 |
| 5,792,432 A | 8/1998 | Kato et al. |
| 6,063,342 A | 5/2000 | Kato et al. |
| 6,833,117 B1 | 12/2004 | Kato et al. |
| 7,172,735 B1 | 2/2007 | Lowe et al. |
| 7,976,783 B2 | 7/2011 | Feinstein |
| 8,257,658 B2 | 9/2012 | Feinstein |

(Continued)

FOREIGN PATENT DOCUMENTS

| GB | 2197597 A * | 5/1988 | ............ B01J 35/026 |
| JP | 2002-143675 A | 5/2002 | |

(Continued)

OTHER PUBLICATIONS

European Patent Office, "Extended European Search Report," issued in European Patent Application No. 18 775 107.8, which is a counterpart to U.S. Appl. No. 16/580,420, dated Nov. 25, 2020, 10 pages.

(Continued)

*Primary Examiner* — Jennifer A Leung

(57) ABSTRACT

A catalytic reactor includes: a reaction-side flow channel in which a reaction fluid flows; structured catalysts accommodated in the reaction-side flow channel. Each structured catalyst includes inclined surfaces in at least part of each of two surfaces facing other structured catalysts. The inclined surfaces are inclined in the same direction with respect to an arrangement direction of the structured catalysts.

8 Claims, 6 Drawing Sheets

(56) References Cited

U.S. PATENT DOCUMENTS

| | | |
|---|---|---|
| 9,039,987 B2 | 5/2015 | Sherman |
| 2006/0008399 A1 | 1/2006 | Feinstein |
| 2008/0159931 A1 | 7/2008 | Feinstein |
| 2011/0211999 A1 | 9/2011 | Feinstein |
| 2011/0305611 A1 | 12/2011 | Freeman et al. |
| 2012/0288420 A1 | 11/2012 | Feinstein |
| 2013/0058843 A1 | 3/2013 | Sherman |
| 2015/0086442 A1 | 3/2015 | Feinstein |
| 2015/0336077 A1 | 11/2015 | Kamata et al. |

FOREIGN PATENT DOCUMENTS

| | | | | |
|---|---|---|---|---|
| JP | 2002-316020 A | 10/2002 | | |
| JP | 2002-316021 A | 10/2002 | | |
| JP | 2003-117335 A | 4/2003 | | |
| JP | 2003-516223 A | 5/2003 | | |
| JP | 2008-505753 A | 2/2008 | | |
| JP | 2013-529543 A | 7/2013 | | |
| JP | 2014-514157 A | 6/2014 | | |
| JP | 2014-151245 A | 8/2014 | | |
| JP | 2015-204142 A | 11/2015 | | |
| WO | 1999/024165 A1 | 5/1999 | | |
| WO | WO-9948604 A1 * | 9/1999 | ............. | C07C 5/333 |
| WO | 2017/033075 A2 | 3/2017 | | |

OTHER PUBLICATIONS

Japan Patent Office, "Notice of Reasons for Refusal," issued in Japanese Patent Application No. 2017-069748, which is a counterpart to U.S. Appl. No. 16/580,420, dated Dec. 8, 2020, 2 pages.

* cited by examiner

CATALYTIC REACTOR

CROSS REFERENCE TO RELATED APPLICATIONS

This application is a continuation application of International Application No. PCT/JP2018/012659, now WO2018/181434, filed on Mar. 28, 2018, which claims priority to Japanese Patent Application No. 2017-069748, filed on Mar. 31, 2017, the entire contents of which are incorporated by reference herein.

BACKGROUND

1. Technical Field

The present disclosure relates to a catalytic reactor performing catalytic reactions.

2. Description of the Related Art

A catalytic reactor includes a flow channel for a reaction fluid (hereinafter referred to as "reaction-side flow channel"), and a structured catalyst installed in the reaction-side flow channel or a catalyst carried on an inner surface of the reaction-side flow channel. When a cross section of the reaction-side flow channel is reduced while a volume of a reaction field is maintained constant in the catalytic reactor, a contact area per volume between the reaction fluid and the catalyst (i.e. specific surface area) is improved. Accordingly, it is possible to increase an efficiency of heat transmission and to improve the reaction rate and the yield.

SUMMARY

When a structured catalyst is installed in a reaction-side flow channel, a predetermined clearance (gap) is provided between the structured catalyst and an inner surface of the reaction-side flow channel. The clearance reduces a friction between the reaction-side flow channel and structured catalyst and facilitates an insertion and removal of the structured catalyst. This clearance is inevitably formed for the insertion and removal of the structured catalyst, but is also a space to unexpectedly allow the reaction fluid to flow without being interacted with the catalyst. That is, the clearance is one of factors degrading a reaction efficiency of the catalytic reactor.

In view of such problems, the present disclosure aims at providing a catalytic reactor that can provide easy insertion and removal of a structured catalyst and can improve a reaction efficiency.

An aspect of the present disclosure is a catalytic reactor including: a reaction-side flow channel in which a reaction fluid flows; a first structured catalyst and a second structured catalyst located in the reaction-side flow channel; wherein the first structured catalyst includes a first inclined surface in at least part of a surface of the first structured catalyst facing the second structured catalyst, the second structured catalyst includes a second inclined surface facing the first inclined surface, in at least part of a surface of the second structured catalyst facing the first structured catalyst, the first inclined surface and the second inclined surface are inclined in the same direction with respect to an arrangement direction of the first structured catalyst and the second structured catalyst, and the first structured catalyst and the second structured catalyst are tilted in the same direction with respect to the arrangement direction in a state where at least part of the first inclined surface and at least part of the second inclined surface are in contact with each other.

The first inclined surface may be formed in the entire surface of the first structured catalyst facing the second structured catalyst, and the second inclined surface may be formed in the entire surface of the second structured catalyst facing the first structured catalyst.

The inner surface of the reaction-side flow channel may be provided with a protrusion or a step configured to contact an end of the first inclined surface or an end of the second inclined surface.

According to the present disclosure, it is possible to provide a catalytic reactor that can provide easy insertion and removal of a structured catalyst and can improve a reaction efficiency.

BRIEF DESCRIPTION OF THE DRAWINGS

FIGS. 5A to 5F are views illustrating exemplary modifications of the structured catalyst according to an embodiment of the present disclosure, wherein FIG. 5A illustrates a first modification, FIG. 5B illustrates a second modification, FIGS. 5C and 5D illustrate a third modification, and FIGS. 5E and 5F illustrate a fourth modification.

DESCRIPTION OF THE EMBODIMENTS

Figure 1:
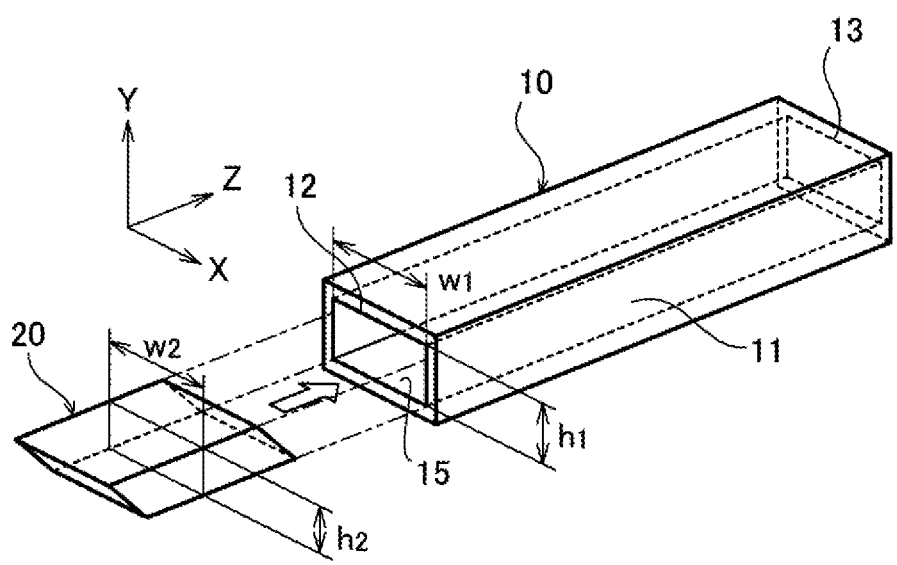
FIG. 1 is a perspective view of a catalytic reactor according to an embodiment of the present disclosure.

A catalytic reactor according to an embodiment of the present disclosure will be described below with reference to the appended drawings. The elements common to the respective drawings are indicated by the same reference numerals, and overlapping explanations are not repeated below.

FIG. 1 is a perspective view of a catalytic reactor according to the present embodiment. As shown in FIG. 1, the catalytic reactor according to the present embodiment includes a reaction-side flow channel 10 and a plurality of structured catalysts 20. Note that the X, Y, and Z directions (axes) in the figure are orthogonal to each other.

The reaction-side flow channel 10 has a tubular structure, and forms a flow space 11 for a reaction fluid that is a gas or a liquid as a reaction target. The flow space 11 has a rectangular cross section orthogonal to the Z direction. As shown in FIG. 1, the flow space 11 extends in the Z direction and defines a flow direction of the reaction fluid. That is, the reaction fluid enters from an inlet 12, flows in the Z direction, and then flows out of an outlet 13. In the present embodiment, the flow space 11 has a rectangular cross section, which is orthogonal to the Z direction and has a length (height) h1 in the Y direction and a length (width) w1 in the X direction.

The material of the reaction-side flow channel 10 is a metal material. The metal material is, for example, a heat-resistant metal such as stainless steel (SUS or the like) or nickel-base alloy (e.g. Inconel (registered trademark), Hastelloy (registered trademark), Haynes (registered trademark)) or the like. The structure of the reaction-side flow channel 10 may be integrally formed of any of these materials, or may be formed by joining separated members by welding or the like.

A plurality of reaction-side flow channels 10 may be provided in parallel to each other. Further, a flow channel for a heat medium (not shown, hereinafter referred to as "heat-medium-side flow channel") may be provided adjacent to the reaction-side flow channel 10. In this case, the heat-medium-side flow channel (not shown) thermally contacts with the reaction-side flow channel 10 via, for example, a partition wall (not shown). The heat medium in the heat-medium-side flow channel (not shown) absorbs heat generated in the reaction fluid in the reaction-side flow channel 10 or releases heat to the reaction fluid in the reaction-side flow channel 10. That is, the heat-medium-side flow channel (not shown) exchanges heat with the reaction-side flow channel 10 to cool or heat the reaction-side flow channel 10 (indirectly the reaction fluid) according to the reaction of the reaction fluid.

Figure 2:
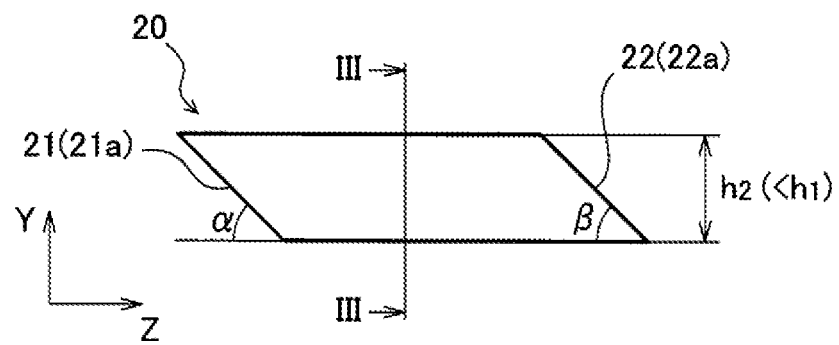
FIG. 2 is a side view of a structured catalyst according to an embodiment of the present disclosure.
Figure 3:
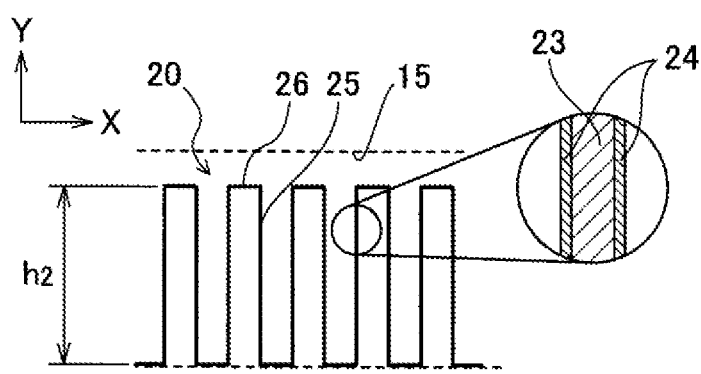
FIG. 3 is a sectional view along a III-III line in FIG. 2.

FIG. 2 is a side view of a structured catalyst 20 according to the present embodiment. FIG. 3 is a sectional view along a III-III line in FIG. 2. A plurality of structured catalysts 20 are separately formed from the reaction-side flow channel 10, and they are located in the reaction-side flow channel 10 as shown in FIG. 1. The structured catalysts 20 may be detachably located in the reaction-side flow channel 10. Otherwise, the structured catalysts 20 may be fitted into and fixed in the reaction-side flow channel 10. When the structured catalyst 20 is detachably located in the reaction-side flow channel 10, it becomes possible to reuse the reaction-side flow channel 10. Alternately, there is a case where an exchange of the structured catalyst 20 is not required due to the characteristic of the reaction target such as toxicity or the like. In this case, it is sufficient for the structured catalyst 20 to be fitted into and fixed in the reaction-side flow channel 10.

Figure 4:
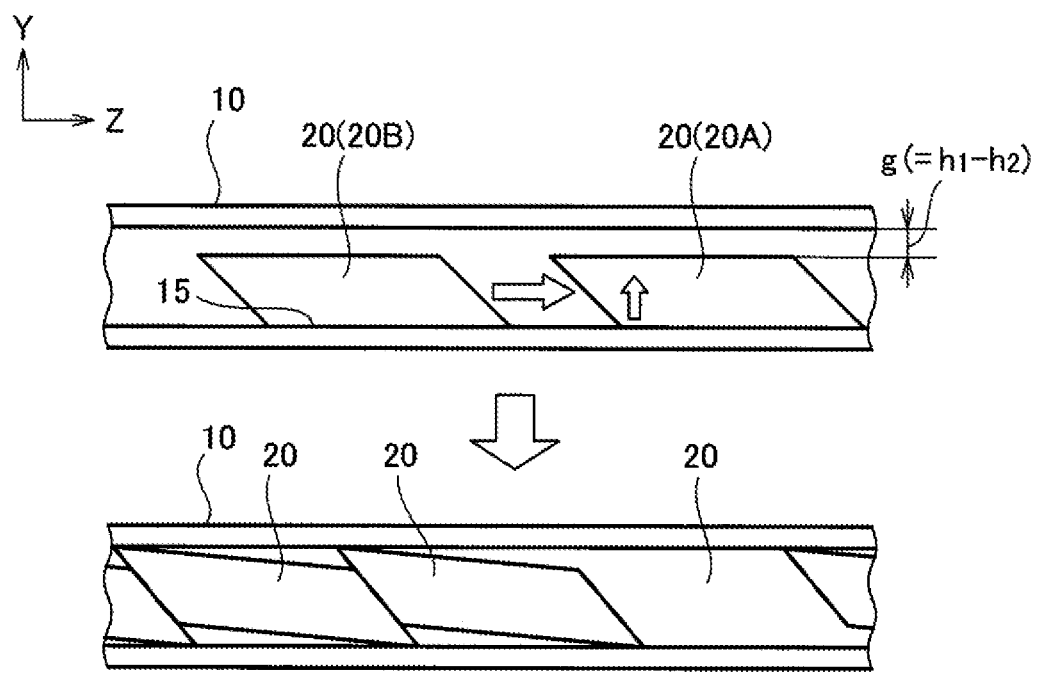
FIG. 4 is a view for explaining an installation of the structured catalyst according to an embodiment of the present disclosure into a reaction-side flow channel.

The structured catalysts 20 are arranged in the Z direction which is an extending direction of the reaction-side flow channel 10 (see FIG. 4). As shown in FIGS. 2 and 3, the structured catalyst 20 includes a corrugated plate on which a catalyst is carried. The structured catalyst 20 has a box-like external shape in which an inlet 12 side and an outlet 13 side are inclined.

As similar to the flow space 11 of the reaction-side flow channel 10, an external shape of the structured catalyst 20 has a rectangular cross section, which is orthogonal to the Z direction and has a length (height) h2 in the Y direction and a length (width) w2 in the X direction. The values h1 and w2 are respectively set smaller than the length (height) h1 in the Y direction and the length (width) w1 in the X direction to allow a slide of the structured catalyst 20 within the flow space 11, in other words, to allow an attachment and an detachment of the structured catalyst 20 with respect to the flow space 11. In the present embodiment, a clearance g (see FIG. 4) in the Y direction is formed between the structured catalyst 20 and an inner surface 15 of the reaction-side flow channel 10 by a difference between the length h1 and the length h2.

The structured catalyst 20 includes an inclined surface (first inclined surface) 21a in at least part of a surface 21 of the structured catalyst 20 on one side in the Z direction. Further, the structured catalyst 20 includes an inclined surface (second inclined surface) 22a in at least part of a surface 22 of the structured catalyst 20 on the other side in the Z direction. For example, as shown in FIG. 2, the inclined surface 21a is formed as the entire surface 21, and the inclined surface 22a is formed as the entire surface 22. The inclined surface 21a and the inclined surface 22a are inclined in the same direction with respect to the Z direction (i.e. the arrangement direction of the structured catalysts 20). For example, the inclination angle $\alpha$ of the inclined surface 21a with respect to the Z direction is equal to the inclination angle $\beta$ of the inclined surface 22a with respect to the Z direction.

As shown in FIG. 3, the structured catalyst 20 includes a base member 23 defining the whole structure including the external shape as described above, and a catalyst layer 24 formed on the base member 23. The base member 23 includes a structure which partitions the flow space 11 into spaces extending in the Z direction. For example, as shown in FIG. 3, the base member is configured of a corrugated plate undulating in the X direction. Meanwhile, the base member 23 may be a complex formed of capillaries that extend in the Z direction and are two-dimensionally arranged in the X and Y directions.

When the base member 23 is configured of a corrugated plate, the base member 23 includes partitioning portions 25 partitioning the flow space 11 into the aforementioned spaces, and linking portions 26 linking between edges of the partitioning portions 25. The partitioning portions 25 and the linking portions 26 are integrally formed to constitute the corrugated plate as a whole. For example, the partitioning portions 25 are provided parallel to a Y-Z plane, the linking portions 26 are alternately positioned across the partitioning portions 25 along the X direction and links between the edges of adjacent two of the partitioning portions 25. Here, each linking portion 26 may be formed into a planar surface or a curved surface. In any case, the linking portions 26 are located both on surfaces, one of which approaches the inner surface 15 of the flow space 11 and the other of which separates from the inner surface 15 when the structured catalyst 20 is tilted within the flow space 11. In other words, the tilt of the structured catalyst 20 can be recognized as a rotation of the structured catalyst 20 around a certain axis as a fulcrum. Therefore, the linking portions 26 can be recognized to be provided on surfaces facing in this rotational direction. As described below, the linking portion 26 comes into contact with a partitioning portion of an adjacent structured catalyst when the structured catalyst 20 is tilted while being in contact with the adjacent structured catalyst, thereby preventing the partitioning portion 25 from entering the adjacent structured catalyst.

The material of the base member 23 is a heat-resistant alloy mainly composed of Fe (iron), Cr (chromium), Al (aluminum), Y (yttrium), for example, metal such as Fecralloy (registered trademark) or the like. A catalytic support of the catalyst layer 24 is appropriately selected depending on the reaction performed in the catalyst reactor. The catalytic support is, for example, one or more selected from the group consisting of $Al_2O_3$ (alumina), $TiO_2$ (titania), $ZrO_2$ (zirconia), $CeO_2$ (ceria), and $SiO_2$ (silica). The catalyst (active metal) of the catalyst layer 24 is appropriately selected depending on the reaction performed in the catalytic reactor. The catalyst is, for example, one or more selected from the group consisting of Ni (nickel), Co (cobalt), Fe (iron), Pt (platinum), Ru (ruthenium), Rh (rhodium), and Pd (palladium).

FIG. 4 is a view for explaining an installation of the structured catalyst 20 according to the present embodiment into a reaction-side flow channel 10. For convenience of the explanation, the Z direction is supposed to be a horizontal direction. In addition, one of two structured catalysts 20 installed in the reaction-side flow channel 10 is referred to as a first structured catalyst 20A, and the other of the two structured catalysts 20 is referred to as a second structured catalyst 20B.

As described above, the first structured catalyst 20A includes the inclined surface (first inclined surface) 21a in at least part of the surface 21 of the first structured catalyst 20A facing the second structured catalyst 20B. In addition, the second structured catalyst 20B includes the inclined surface (second inclined surface) 22a in at least part of the surface 22 of the second structured catalyst 20B facing the first structured catalyst 20A, the second inclined surface 22a facing the first inclined surface 21a. The inclined surface 21a and the inclined surface 22a are inclined in the same direction with respect to the arrangement direction of the first structured catalyst 20A and the second structured catalyst 20B (i.e. in the Z direction). As described below, the first structured catalyst 20A and the second structured catalyst 20B are tilted in the same direction with respect to the arrangement direction in a state where at least part of the first inclined surface 21a and at least part of the second inclined surface 22a are in contact with each other.

Firstly, the first structured catalyst 20A is inserted into an opening (e.g. the inlet 12) of the reaction-side flow channel 10, and is set at a predetermined position. Thereafter, the second structured catalyst 20B is inserted into the opening (e.g. the inlet 12) of the reaction-side flow channel 10. The second structured catalyst 20B is brought into contact with the first structured catalyst 20A and pushes the first structured catalyst 20A. At this time, the inclined surface 22a of the second structured catalyst 20B pushes the inclined surface 21a of the first structured catalyst 20A while slidably contacting with the inclined surface 21a of the first structured catalyst 20A. With this pressing, a force in the Y direction is applied to the inclined surface 21a, and the inclined surface 21a side of the first structured catalyst 20A moves in the Y direction.

Specifically, a projecting structure including the inclined surface 22a of the second structured catalyst 20B functions as a wedge inserted between the first structured catalyst 20A and the inner surface 15 of the reaction-side flow channel 10, and pushes up (crawls up) part of the first structured catalyst 20A on the inclined surface 21a side in the Y direction. In addition, the inclined surface 21a assists (guides) the insertion of the protruding structure. As a result, the first structured catalyst 20A is tilted with respect to the Z direction, and the edge of the inclined surface 21a of the first structured catalyst 20A is brought into contact with the inner surface 15 of the reaction-side flow channel 10 which is located across the first structured catalyst 20A from the inner surface 15 having been contacted with the first structured catalyst 20A at the beginning of insertion.

The second structured catalyst 20B is pushed by the next inserted structured catalyst 20 and is tilted as same as the first structured catalyst 20A is. Such operations are repeated, and the structured catalysts 20 are arranged in the Z direction and are tilted with respect to the Z direction (see FIG. 4). That is, the first structured catalyst 20A and the second structured catalyst 20B are tilted with respect to the Z direction (arrangement direction) in a state where at least part of the inclined surface 21a of the first structured catalyst 20A and at least part of the inclined surface 22a of the second structured catalyst 20B are in contact with each other.

As described above, the clearance g (see FIG. 4) in the Y direction is formed between the structured catalyst 20 and the inner surface 15 of the reaction-side flow channel 10 in the Y direction by a difference between the length (height) h1 and the length (height) h2. The first structured catalyst 20A is tilted to close an opening formed with the clearance g as much as possible. Accordingly, the reaction fluid flowing in the clearance g also flows through the first structured catalyst 20. That is, the amount (the ratio) of the reaction fluid, which passes through the reaction-side flow channel 10 without contact with the structured catalyst 20, is reduced. Accordingly, it is possible to improve the reaction efficiency of the catalytic reactor. Further, since the clearance g is provided, a friction between the structured catalyst 20 and the inner surface 15 of the reaction-side flow channel 10 is reduced. Accordingly, an easy insertion and removal of the structured catalyst 20 is maintained.

In the present embodiment, the inclined surface 21a is formed in the entire surface 21 on one side in the Z-direction. Similarly, the inclined surface 22a is formed in the entire surface 22 on the other side in the Z-direction. When paying attention to the first structured catalyst 20A and the second structured catalyst 20B, the inclined surface 21a is formed in the entire surface of the first structured catalyst 20A facing the second structured catalyst 20B, and the inclined surface 22a is formed in the entire surface of the second structured catalyst 20B facing the first structured catalyst 20A. Since such surfaces can be easily formed, the manufacturing cost is reduced when a large number of the structured catalysts 20 are manufactured. Moreover, the contact area with the reaction fluid in the flow space 11 can be increased as much as possible.

The structured catalyst 20 may be inserted upside down. In this case, the protruding structure including the inclined surface 21a of the first structured catalyst 20A functions as a wedge inserted between the second structured catalyst 20B and the inner surface 15 of the reaction-side flow channel 10, and pushes up (crawls up) part of the second structured catalyst 202 on the inclined surface 22a side in the Y direction.

Figure 5A:
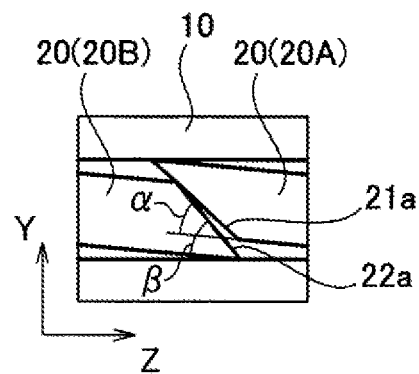
Figure 5B:
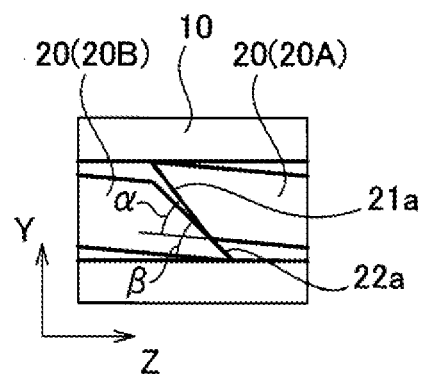
Figure 5C:
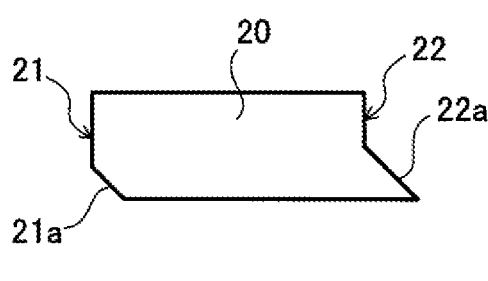
Figure 5D:
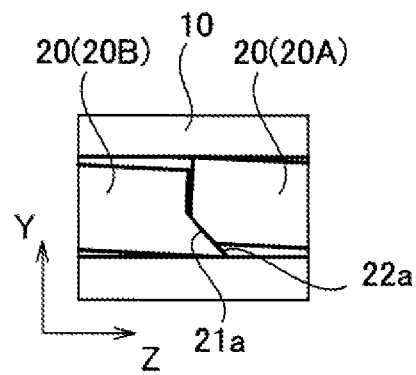
Figure 5E:
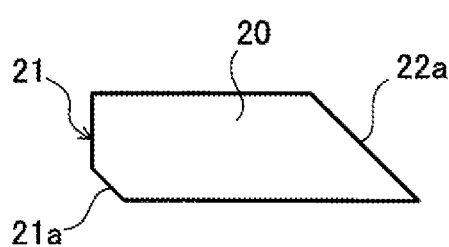
Figure 5F:
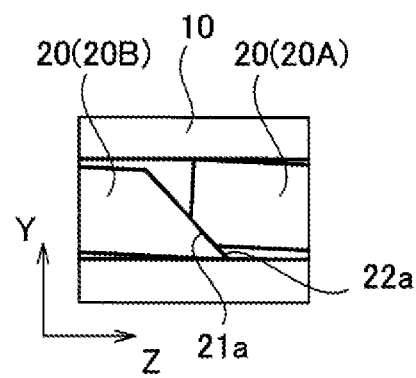

FIGS. 5A to 5F are views illustrating exemplary modifications of the structured catalyst according to the present embodiment, wherein FIG. 5A illustrates a first modification, FIG. 5B illustrates a second modification, FIGS. 5C and 5D illustrate a third modification, and FIGS. 5E and 5F illustrate a fourth modification. As shown in FIGS. 5A and 5B, the inclination angle α of the inclined surface 21a with respect to the Z direction and the inclination angle β of the inclined surface 22a with respect to the Z direction may be different from each other. That is, the inclination angle α may be smaller than the inclination angle β as shown in FIG. 5A, and the inclination angle α may be larger than the inclination angle β as shown in FIG. In any case, the friction between the two adjacent structured catalysts 20, 20 can be reduced, and tilting of the structured catalyst 20 with respect to the Z direction is facilitated.

As described above, the inclined surface 22a pushes up the part of the structured catalyst 20 on the inclined surface 21a side facing the inclined surface 22a in the Y direction. As long as this function is not impaired, the inclined surface 21a may be formed in part of a surface including the inclined surface 21a, and the inclined surface 22a may be formed in part of a surface including the inclined surface 22a. For example, as shown in FIGS. 5C and 5D, the inclined surface 21a is formed in part of the surface 21, and the inclined surface 22a is also formed in part of the surface 22 corresponding to the inclined surface 21a. Alternatively, as shown in FIGS. 5E and 5F, the inclined surface 21a, may be formed in part of the surface 21, while the inclined surface 22a may be formed in the entire surface 22.

Figure 6:
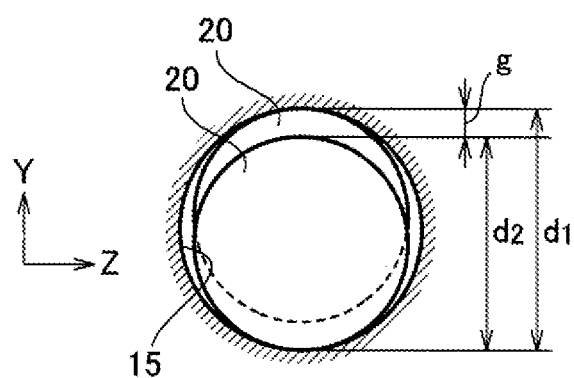
FIG. 6 is a view of an exemplary modification of the catalyst reactor according to the embodiment of the present disclosure as viewed from the arrangement direction of the structured catalysts.

FIG. 6 is a view of an exemplary modification of the catalyst reactor according to the present embodiment as viewed from the arrangement direction of the structured catalysts. As seen in this modification, the cross section of the flow space 11 of the reaction-side flow channel 10 and the cross section of the structured catalyst 20 are not limited to a rectangle. That is, the reaction-side flow channel 10 may have a flow space 11 having a circular cross section with a diameter d1, and an external shape of the structured catalyst 20 may be formed in a cylindrical shape having a circular cross section with a diameter d2 (<d1). Further, the inclined surface 21a and the inclined surface 22a are not only inclined in the same direction with respect to the Z direction, but may be twisted (skewed) from each other around the center axis of the structured catalyst 20 as a reference. When the inclined surface 21a and the inclined surface 22a are in skew relationship, an opening formed by the clearance g (=d1−d2) can be closed as much as possible compared to the case in which they are not in skew relationship. Other configurations are the same as those of the above-described embodiment.

Figure 7:
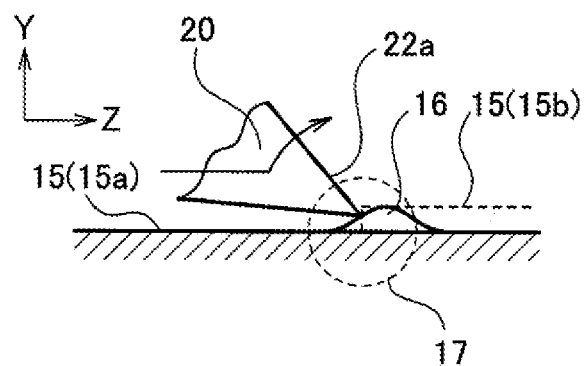
FIG. 7 is a view illustrating an exemplary modification of the reaction-side flow channel in the catalytic reactor according to the embodiment of the present disclosure.

FIG. 7 is a view illustrating an exemplary modification of the reaction-side flow channel in the catalytic reactor according to the present embodiment. As shown in FIG. 7, the inner surface 15 of the reaction-side flow channel 10 may be provided with a protrusion 16 formed on the inner surface 15. The protrusion 16 is configured to contact the end of the inclined surface 21a or the end of the inclined surface 22a. The protrusion 16 protrudes from the inner surface 15 toward the inside of the reaction-side flow channel 10, and is located near an opening (for example, the outlet 13) on a side opposite to a side on which an opening (for example, the inlet 12) of the reaction-side flow channel 10 into which the structured catalyst 20 is inserted. The protrusion 16 contacts with an end of the inclined surface 21a or an end of the inclined surface 22a of the structured catalyst 20 which is firstly inserted into the reaction-side flow channel 10, and thereby regulating further insertion (movement) of the structured catalyst 20. As a result, as indicated by an arrow in the figure, it is possible to easily tilt the structured catalyst 20 inserted first, and to restrict the unexpected movement of the inserted structured catalyst 20. As shown by the dotted line in the figure, a step 17 may be formed instead of the protrusion 16. The step 17 is formed on the inner surface 15 of the reaction-side flow channel 10 at a boundary between a portion 15a where the structured catalyst 20 is disposed and a portion 15b where the structured catalyst 20 is not disposed. Here, the portion 15b is located more inner in the reaction-side flow channel 10 than the portion 15a.

Figure 8:
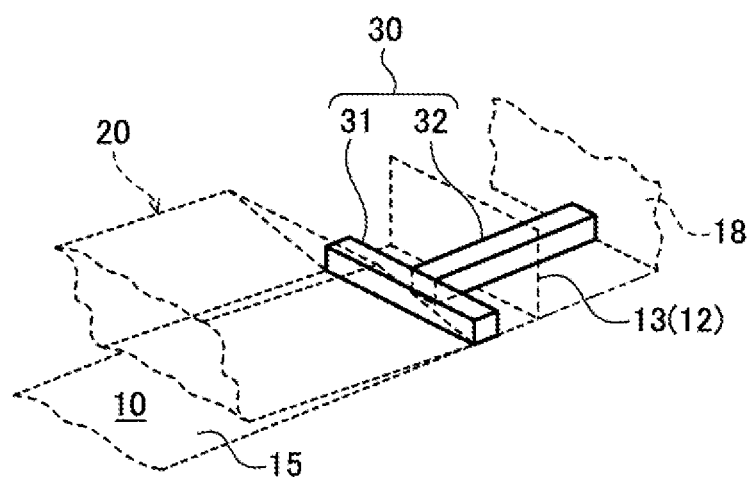
FIG. 8 is a view illustrating a jig in the catalytic reactor according to the embodiment of the present disclosure.

FIG. 8 is a view illustrating a jig in the catalytic reactor according to the present embodiment. As shown in this figure, a jig 30 may be used instead of the protrusion 16 and the step 17 as shown in FIG. 7. The jig 30 has a T-shaped structure, for example. The jig 30 restricts the movement of the structured catalyst 20 in the same manner as the protrusion and the step 17 shown in FIG. 7. However, unlike the protrusion 16 and the step 17, the jig 30 is detachably provided in the reaction-side flow channel 10. Further, the jig 30 is installed on at least one of the inlet 12 side and the outlet 13 side of the reaction-side flow channel 10.

As shown in FIG. 8, the jig 30 includes a stopper 31 disposed on the inner surface 15 of the reaction-side flow channel 10, and a support portion 32 that defines the position of the stopper 31 and supports the stopper 31. The stopper 31 and the support portion 32 may be formed separately, or may be formed integrally. The stopper 31 is formed into a rod-like shape extending along the inner surface 15 of the reaction-side flow channel 10 in a direction (that is, the X direction) orthogonal to the extending direction of the reaction-side flow channel 10, and is located on the inner surface 15 of the reaction-side flow channel 10. Further, the stopper 31 contacts the end of the inclined surface 21a or the end of the inclined surface 22a. The stopper 31 is formed of the same metal material as the reaction-side flow channel 10, for example.

The support portion 32 is placed at a position opposite to the structured catalyst 20 in contact with the stopper 31 and supports the stopper 31. The support portion 32 is formed into a rod-like shape extending in the extending direction (that is, the Z direction) of the reaction-side flow channel 10 and supports the stopper 31. One end of the support portion 32 contacts (connects) to the stopper 31. The other end of the support portion 32 contacts, for example, a wall surface 18 facing the outlet 13 or the inlet 12 of the reaction-side flow channel 10. The wall surface 18 is, for example, an inner surface of a flow channel continuously connected to the reaction-side flow channel 10. Otherwise, the other end of the support portion 32 may be fixed to the wall surface 18 or the inner surface 15 of the reaction-side flow channel 10 with a fastening member (not shown). As same as the stopper 31, the support portion 32 is also formed of the same metal material as the reaction-side flow channel 10, for example. However, the support portion 32 may be composed of elastic members, such as a spring.

As described above, the jig 30 is detachably provided in the reaction-side flow channel 10, and it is not necessary to process the inner surface 15 itself like the protrusion 16 and the step 17. Accordingly, it is possible to easily determine the dimension and shape depending on the shape of the structured catalyst 20. Moreover, since the cross section of the reaction-side flow channel 10 on the downstream side is not narrowed compared with the case where the step 17 is formed, an increase in pressure loss in the reaction-side flow channel 10 can be suppressed.

The scope of the present disclosure is not limited to the above-described embodiment, is shown by the description of claims, and further includes all modifications within the description of claims and the meaning equivalent thereto.

What is claimed is:

1. A catalytic reactor comprising:
   a reaction-side flow channel in which a reaction fluid flows, extending in an extending direction defining a flow direction of the reaction fluid; and
   a first structured catalyst and a second structured catalyst located in the reaction-side flow channel and arranged in the extending direction of the reaction-side flow channel; wherein
   the first structured catalyst includes a first inclined surface in at least part of a surface of the first structured catalyst facing the second structured catalyst,
   the second structured catalyst includes a second inclined surface facing the first inclined surface, in at least part of a surface of the second structured catalyst facing the first structured catalyst, the first inclined surface and the second inclined surface are inclined in the same direction with respect to an arrangement direction of the first structured catalyst and the second structured catalyst, the first structured catalyst and the second structured catalyst are tilted in the same direction with respect to the arrangement direction in a state where at least part of the first inclined surface and at least part of the second inclined surface are in contact with each other, and the first and second structured catalysts include a corrugated plate on which a catalyst is carried.

2. The catalytic reactor according to claim 1, wherein
the first inclined surface is formed in the entire surface of the first structured catalyst facing the second structured catalyst, and
the second inclined surface is formed in the entire surface of the second structured catalyst facing the first structured catalyst.

3. The catalytic reactor according to claim 1, wherein
the inner surface of the reaction-side flow channel is provided with a protrusion or a step configured to contact an end of the first inclined surface or an end of the second inclined surface.

4. The catalytic reactor according to claim 2, wherein
the inner surface of the reaction-side flow channel is provided with a protrusion or a step configured to contact an end of the first inclined surface or an end of the second inclined surface.

5. The catalytic reactor according to claim 1, wherein
an inclination angle of the first inclined surface with respect to the arrangement direction and an inclination angle of the second inclined surface with respect to the arrangement direction are different from each other.

6. The catalytic reactor according to claim 1, wherein
the first inclined surface is formed in only part of the surface of the first structured catalyst facing the second structured catalyst, and
the second inclined surface is formed in only part of the surface of the second structured catalyst facing the first structured catalyst.

7. The catalytic reactor according to claim 1, wherein
the second inclined surface is formed in the entire surface of the second structured catalyst facing the first structured catalyst, and
the first inclined surface is formed in only part of the surface of the first structured catalyst facing the second structured catalyst, the only part being in contact with the second inclined surface on a tip side of the second structured catalyst.

8. The catalytic reactor according to claim 1, wherein
the first and second structured catalysts are tilted to close a clearance between the first and second structured catalysts and an inner surface of the reaction-side flow channel.

* * * * *